Figure 1:
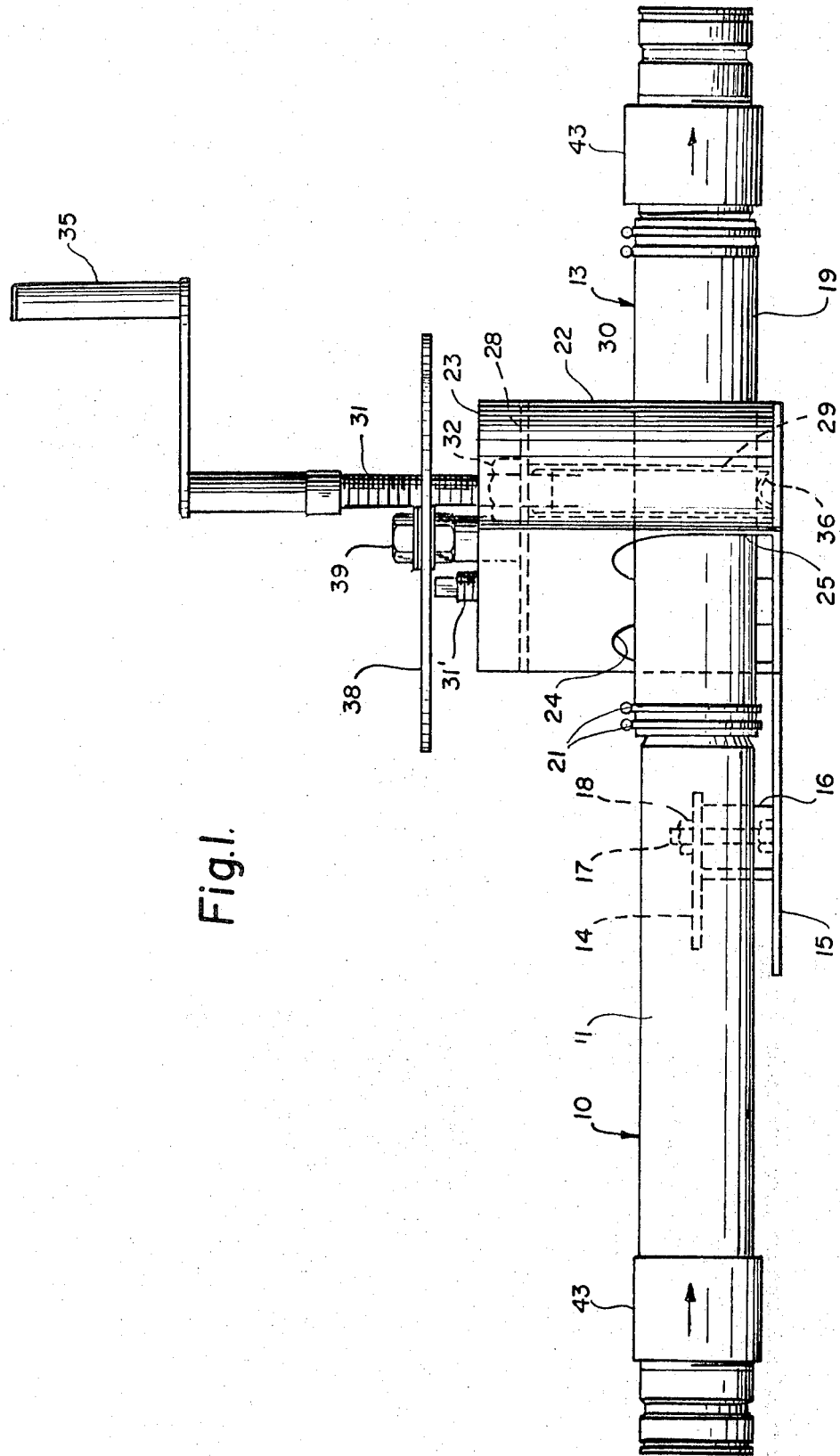

United States Patent [19]
Smith

[11] 3,840,038
[45] Oct. 8, 1974

[54] ANTI-BLOCKING VALVE APPARATUS
[75] Inventor: Carlowen Smith, Fairmont, W. Va.
[73] Assignee: Industrial Contracting of Fairmont, Inc., Fairmont, W. Va.
[22] Filed: Feb. 9, 1973
[21] Appl. No.: 331,329

[52] U.S. Cl................ 137/637.1, 137/382, 251/8, 251/291
[51] Int. Cl. .................... F16k 7/06, F16k 35/14
[58] Field of Search .............. 251/4–8, 291, 251/292; 137/637.1, 382, 382.5

[56] References Cited
UNITED STATES PATENTS

| | | | |
|---|---|---|---|
| 1,230,007 | 6/1917 | Milliken | 251/8 |
| 1,700,761 | 2/1929 | Davis | 251/291 X |
| 2,250,117 | 7/1941 | Noblitt et al. | 251/8 |
| 2,692,617 | 10/1954 | Jensen | 137/637.1 |

Primary Examiner—William R. Cline
Assistant Examiner—Richard Gerard
Attorney, Agent, or Firm—Buell, Blenko & Ziesenheim

[57] ABSTRACT

The specification discloses valve apparatus installable in pipe line systems, carrying rockdust for use in coal mines, and adapted to prevent blocking of the pipe lines by an accumulation of rockdust. The valve apparatus comprises a Y-pipe fitting and a valve section of the pinch valve type. A pair of screw-operated pinch valves control flow through the main section and branch section, respectively, of the Y-pipe fitting. A rotary disc blocks access to the screws for operating the pinch valves except when a screw is in vertical registry with a radial recess in the disc. Closing of the main pipe line downstream of the branch line prior to opening the branch line which is necessary in order to prevent blocking, is thus assured.

6 Claims, 3 Drawing Figures

ANTI-BLOCKING VALVE APPARATUS

This invention relates to valve apparatus installable in pipe lines, carrying rockdust for use in coal mines, and adapted to insure shut-off of flow in the main line prior to opening a branch line and vice versa, thereby preventing undesirable accumulations of rockdust resulting in blockage of the pipe lines.

The blowing of rockdust into certain areas of a coal mine to minimize the danger of explosive mixtures of coal dust in the air has been a wide spread practice for many years. Rockdust is conducted to points of distribution in the mines by blowing a mixture of rockdust and air through main pipe lines, usually of the order of 4 to 6 inches in diameter, and tapped off the main line through a number of branch lines. Customarily each branch line has a valve adjacent the main line to close-off or open the supply of rockdust through the branch line.

Difficulties have arisen in the supply of rockdust through pipe lines due to accumulation of rockdust at points in the pipe lines, such as at the branch lines, which resulted in blockage of flow through the main pipe line. Thus, for example, if a valve-controlled branch line is opened and the main line is not valved to prevent passage past the branch line, the rockdust lying in the main pipe line beyond the branch valve will reverse its pattern of flow, and flow toward the open branch line valve. After the main pipe line pressure drains to a value equal to that in the branch line, rockdust will begin to by-pass the branch line and replace the air in the main pipe line. The accumulation of an excess amount of rockdust local to this point in the pipe line may cause a blockage of flow in the pipe line.

If rockdust is discharged from a main pipe line via a succession of branch line valves without turning off flow in the main line, the accumulation described above may increase further in density at branch line valves further downstream, even to the extent of complete blockage.

I have found also that if a valve is installed in the main pipe line at each branch, a blockage may occur by reason of an operator opening the main line valve too rapidly. A rapid in-rush of air causes a pile-up of the dry rockdust bulk lying in the pipe line and a consequent block. This difficulty could be obviated by a slow opening of the main pipe line valve in contrast to a rapid opening.

I have also found that if the angle of the branch pipe line to the main pipe line is too abrupt or sharp, the consequent resistance to flow of the dry bulk of rockdust will cause a piling in of slugs due to the changes in velocity. A pile-up of slugs can cause a block.

It is the object of this invention to provide valve apparatus, installable in rockdust pipe systems, which is operable in a manner to avoid the above difficulties and thereby prevent accumulations of rockdust which blocks the flow in the pipe line systems.

More specifically, I provide a valve unit having a pair of valves which necessitates closure of one valve before the other can be opened. The valve unit comprises a main line valve, a branch line valve, and a rotary disc which blocks access to said valves for operation except in a specific position of the disc for each valve. The valves are of the screw-operated pinch valve type having a pinch-bar activated by a vertically oriented screw to open and close a hose connected to the main or branch pipe line of the unit. The rotary disc has a hole therein through which access, by a socket wrench or screw driver, to the valve activating screws may be had. Thus, the disc blocks opening of one valve until the other is closed, by requiring the valve actuating screw to be screwed down below the level of the rotary disc in order to permit the disc to be rotated to register the hole therein with the actuating screw of the other valve.

Moreover, by providing a valve unit comprising screw-operated valves, I insure the required slowness of valve operation to prevent pipe line blockage.

I further provide a valve unit in which the angle between the branch line and the main line is of the order of 30°, an angle which I have found to be sufficiently small to obviate any blockage difficulties.

I am aware of prior art patents involving valve interlocking means for insuring a certain sequence of operation of two or more valves, such as U.S. Pat. Nos. 887,826 (Maniex), 2,614,788 (Woodward) and 2,884,008 (Elsdon). However these patents do not disclose valve apparatus capable of providing a solution to the problems and difficulties occurring in rockdusting systems as heretofore discussed.

Figure 2:
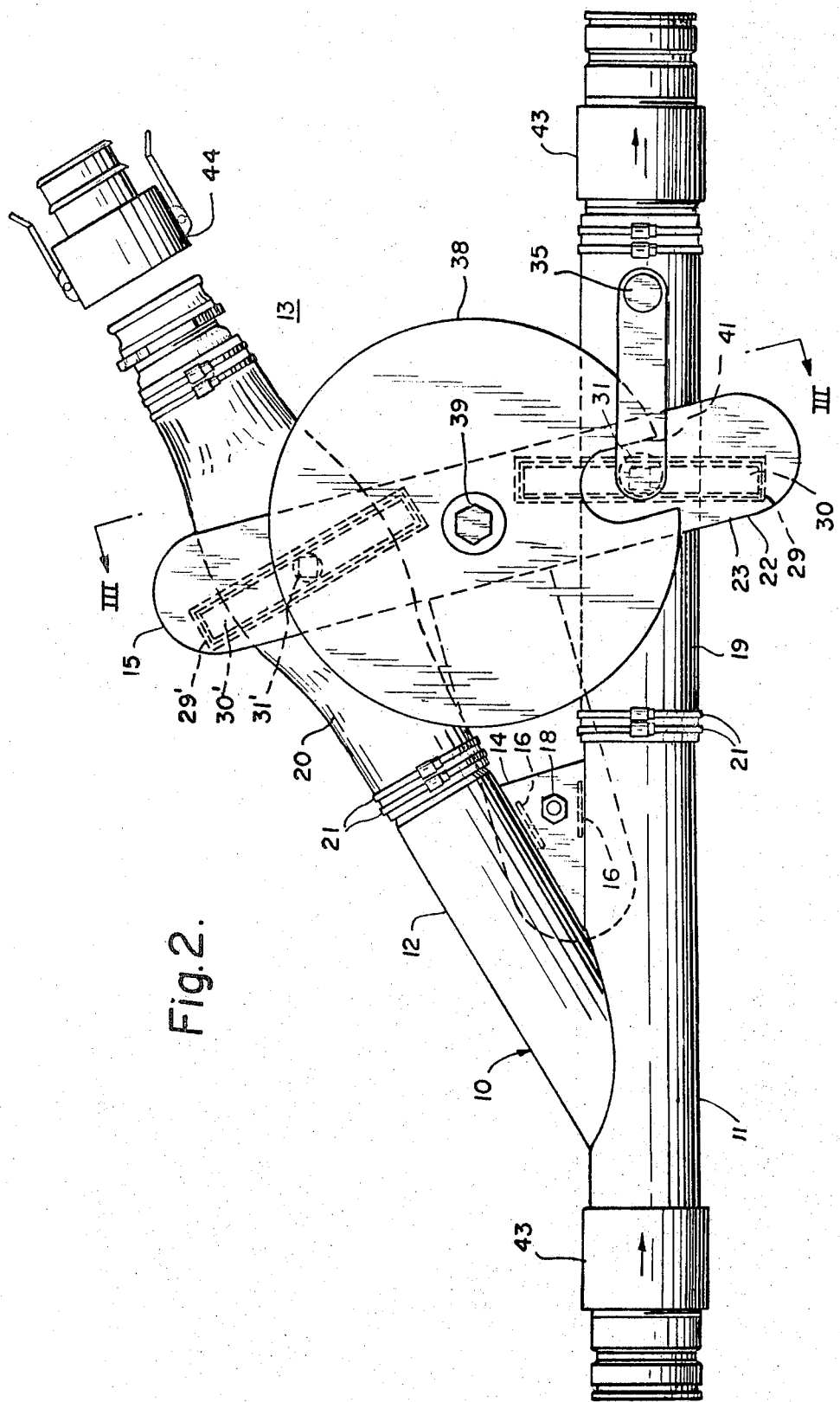
Figure 3:
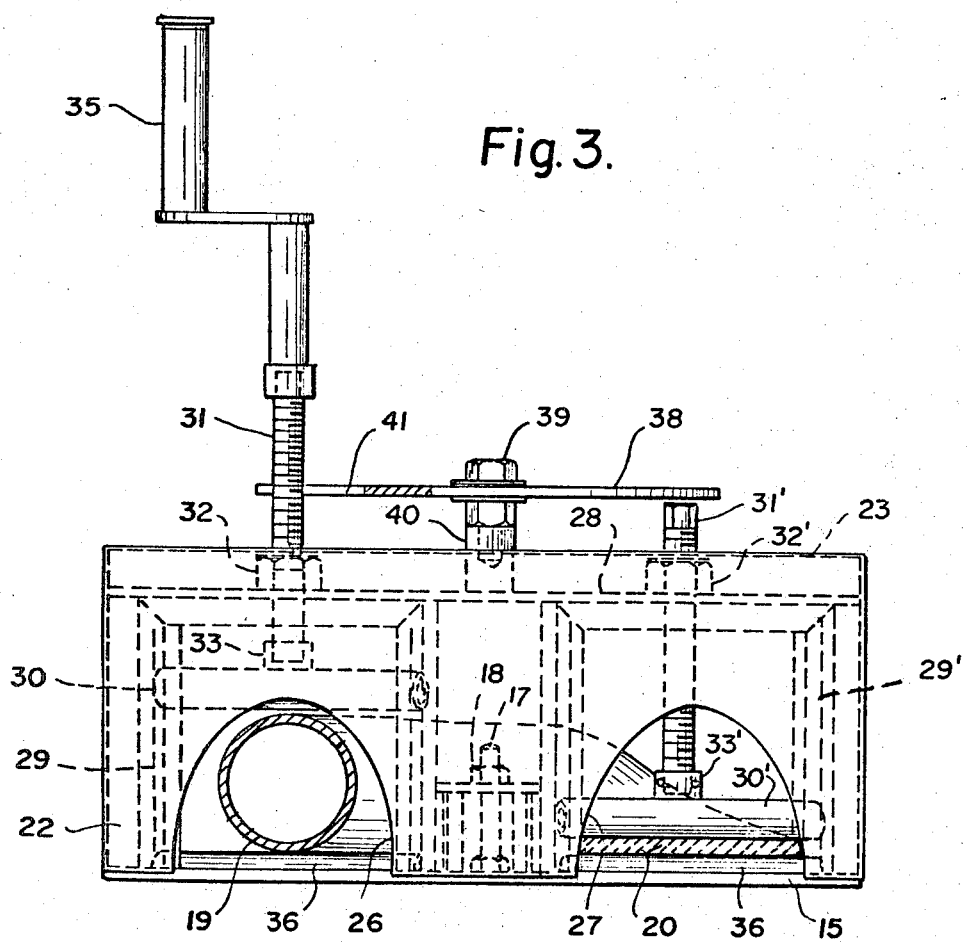

While certain features of my improved valve apparatus have been mentioned above, additional features will be apparent from the following detailed description of a preferred embodiment thereof, taken in connection with the accompanying drawings, wherein FIG. 1 is a side elevational view of my improved valve apparatus, at reduced scale, FIG. 2 is a plan view of the valve apparatus of FIG. 1, and FIG. 3 is a sectional view, taken on the line III—III of FIG. 2.

Referring to the drawings, the valve apparatus shown comprises a Y-pipe fitting 10 having a main pipe section 11 and a branch pipe section 12, and a valve section 13. The Y-fitting 10 is preferably fabricated by welding the branch pipe section 12 to the main pipe section 11 at an angle of 30°, with a V-shaped plate 14 welded to the pipe sections, in the space therebetween, substantially at the level of the horizontal diameter of the pipe sections. The Y-fitting 10 is attached in a horizontal position to a T-shaped base 15, common to the pipe fitting 10 and the valve section 13, by means of a pair of angularly spaced support plates 16 and a bolt 17. The head of bolt 17 is attached as by spot welding to the base 15 and the shank of the bolt extends upwardly through a hole in the V-shaped plate 14, a nut 18 on the end of the bolt serving to hold the Y-fitting to the base.

The valve section 13 is of the pinch valve type and comprises a pair of similar hose elements 19 and 20 of approximately equal lengths respectively connected, as by clamps 21, to the ends of the main pipe section 11 and branch pipe section 12 of the Y-fitting. The hose elements are of any suitable elastomeric or rubber composition capable of being collapsed, or pinched diametrically, to a closed position. Straddling the hose elements 19 and 20 is an elongated cover member 22 of sheet metal, constituting an enclosure and conforming in contour to the transverse portion of the T-shaped base 15 to which it may be removably attached. Cover member 22 has a top enclosing element 23 and is open at the bottom. The opposite side walls of the cover member 22 are provided with registering pairs of spaced openings 24, 25 and 26, 27, through which the hose elements 19 and 20 extend.

Secured in a horizontal position, as by welding, to the walls of the cover member 22, is an upper support plate 28.

Associated with each of the hose elements 19 and 20 in straddling relation thereto within the space enclosed by the cover member 22 are channel guide elements 29 and 29' of U-shaped contour. The guide elements 29 and 29' are attached in inverted U position as by spot welding the base of the guide elements to the bottom surface of the upper support plate 28. Vertically slidable in the channel legs of the U-shaped guide elements 29 and 29' are pinch clamp members 30 and 30' respectively, shown as metallic tube or pipe sections. The pinch clamp members 30 and 30' are activated by vertically oriented screws 31 and 31' respectively, which extend through holes in the guide elements and the support plate and engage nut elements 32 and 32' respectively attached to the upper support plate 28 over the holes therein.

The lower end of each of the screws 31 and 31' is rotatably attached or swiveled in a bearing element 33, 33' on the pinch clamp members 30 and 30'. Suitable felt packing is provided in the nut elements 32, 32' and the bearing elements 33, 33' to prevent entering of dust and dirt therein which might cause jamming or undue wear.

The upper end of each screw 31 and 31' is formed to be received in a corresponding recess of a socket wrench 35, whereby the screws are turned in one direction or the other. When turned in one direction the screws 31, 31' travel through the corresponding nut elements 32, 32' in a direction to shift the pinch tubes 30, 30' downwardly from a position above the corresponding hose element 19, 20 as shown on the left in FIG. 3 to a position squeezing the hose element flat as shown on the right in FIG. 3. In order to insure a tight closure or seal between the wall sections of the hose element, a rounded bar or tube 36 is attached to the base 15 in vertical alignment with each of the pinch tubes 30, 30'. Thus the walls of the hose elements are squeezed between the pinch tube 30, 30' and the corresponding bar 36.

Rotation of the screws 31, 31' in a reverse direction causes the pinch tubes 30, 30' to travel upwardly in the corresponding guide element 29, 29' until the hose element is completely opened again.

For reasons hereinafter more fully made apparent, a circular metallic disc 38 is rotatably mounted horizontally in spaced relation above the top 23 of the cover member 22. As will be seen in FIG. 3, the disc 38 is secured at its center to a bolt 39 which is screwed into a swivel element 40 projecting through a hole in the top 23 of cover member 22 and supported on the upper support plate 28. The disc 38 is of such diameter that the screws 31, 31' lie within the projection of the outer periphery thereof. The disc 38 has a recess or radial slot 41 opening at the periphery thereof, which when in vertical registry with either of the screws 31, 31' provides access thereto for turning by a wrench 35. It will be seen that one of the screws 31, 31' must be screwed down below the disc 38, in which position the corresponding hose element 19 or 20 is squeezed closed, before the disc may be rotated so as to place the recess 41 in vertical registry with the other screw, to allow the latter screw to be turned so as to open the corresponding hose element.

In operation, let it first be assumed that the valve apparatus is installed in a rockdust pipe system by connecting the free end of the main pipe section 11 of the Y-fitting 10 and the free end of the hose element 19 into the main pipe line of the rockdust system and by connecting the free end of the hose element 20 to the branch line of the rockdust system. Suitable pipe couplings 43 and disconnect couplings 44 may be provided for this purpose.

Let it be also assumed that the screw 31 is in raised position as shown, wherein the hose element 19 is open, thereby opening communication through the main pipe line of the rockdust system, the direction of flow of rockdust being in the right-hand direction, as indicated by the arrows.

If, now, it is desired to open communication through the branch pipe line of the rockdust system, the operator must first close communication through the hose element 19 by turning screw 31 down, in which position the upper end of screw 31 is below the disc 38. Following this, disc 38 is now turned by the operator until the recess 41 is in vertical registry with screw 31'. Access to screw 31' being thus provided, the operator then places the wrench 35 on the upper end of screw 31' and turns it so as to open communication through the hose element 20 and the branch pipe line connected thereto from the main pipe section 11 at a point upstream from the closed hose element 19.

It will be seen that the precautions hereinbefore referred to, for preventing the occurrence of blockage in the pipe system, are automatically observed. By reason of the time required to squeeze hose element 19 closed, as necessitated by turning the screw 31, as well as the time required to open the hose element 20 for a similar reason, blockage of flow through the system is prevented. Moreover, the flow of rockdust and air through the main pipe line is necessarily interrupted at a point downstream of the branch pipe line, prior to operation of the pinch valve section 13 to open communication through the branch pipe line.

In a similar manner, should it be desired to cut off flow to the branch pipe line, screw 31' must first be turned down below the level of rotary disc 38 to squeeze hose element 20 closed, before disc 38 can be rotated to place recess 41 in vertical registry with screw 31 to enable it to be turned up to open communication through hose element 19 and thereby open the main pipe line of the rockdust system.

While I have described herein specific details of my preferred embodiment of valve apparatus, it will be apparent that modifications may be made therein within the terms of the following claims. I claim:

1. Valve apparatus comprising a Y-Pipe fitting having a main pipe section and a branch pipe section, a first hose element connected to one end of said main pipe section, a second hose element connected to the end of said branch pipe section, a support member having aligned openings through which the said hose elements extend, a pinch clamp member for each of said hose elements guidably supported by said support member, a screw and a fixed nut means in which said screw rotates for activating each of said pinch clamp members, and a single element shiftable to two different positions, in one of which it blocks axial movement of one of said screws to shift the corresponding pinch clamp member to open its associated hose element while permitting axial movement of the other of said screws to shift its corresponding pinch clamp member to open and close its associated hose element, and in the other of which it permits axial movement of said one of said screws to open and close its corresponding hose element while blocking axial movement of said other screw to open its associated hose element.

2. Valve apparatus according to claim 1, wherein the branch pipe section of said Y-pipe fitting joins the main pipe section at an angle not substantially in excess of 30°.

3. Valve apparatus according to claim 1, wherein each of said nut means is secured to said support member and each of said screws is vertically oriented while engaging said nut means and has a swivel connection to its corresponding pinch clamp member, and wherein said single element moves in a horizontal plane intersecting the axes of both said screws.

4. Valve apparatus according to claim 3, wherein said single element comprises a horizontally disposed disc rotatably mounted on said support member in parallel spaced relation thereto and above said screws, said disc having a radial recess therein selectively vertically alignable with the vertically oriented screws to provide access therethrough to the screw by an operating tool.

5. Valve apparatus according to claim 4, wherein said vertically oriented screws are of such length as to project through the said radial recess above the plane of said disc to block rotation of said disc unless the screw is turned sufficiently in to activate the corresponding pinch clamp member to a hose-closing position.

6. Valve apparatus according to claim 1, wherein a pair of U-shaped channel guide members for said pinch clamp members are attached to said support member in inverted straddling relation respectively to said hose elements.

* * * * *